US009436872B2

(12) United States Patent
Tang et al.

(10) Patent No.: US 9,436,872 B2
(45) Date of Patent: Sep. 6, 2016

(54) SYSTEM AND METHOD FOR DETECTING AND TRACKING MULTIPLE PARTS OF AN OBJECT

(71) Applicant: Hong Kong Applied Science and Technology Research Institute Co. Ltd., Shatin, New Territories (HK)

(72) Inventors: Xueyan Tang, Hong Kong (HK); You Ding, Hong Kong (HK)

(73) Assignee: Hong Kong Applied Science and Technology Research Institute Company Limited, Hong Kong (CN)

( * ) Notice: Subject to any disclaimer, the term of this patent is extended or adjusted under 35 U.S.C. 154(b) by 283 days.

(21) Appl. No.: 14/187,334

(22) Filed: Feb. 24, 2014

(65) Prior Publication Data
US 2015/0242683 A1    Aug. 27, 2015

(51) Int. Cl.
G06K 9/34     (2006.01)
G06K 9/00     (2006.01)
G06T 7/20     (2006.01)

(52) U.S. Cl.
CPC ....... *G06K 9/00389* (2013.01); *G06K 9/00382* (2013.01); *G06T 7/2033* (2013.01); *G06T 2207/10016* (2013.01); *G06T 2207/30196* (2013.01)

(58) Field of Classification Search
CPC ............... G06K 9/00389; G06K 9/00382; G06T 7/2033; G06T 2207/10016; G06T 2207/30196
USPC ................................. 382/173, 128, 165, 251
See application file for complete search history.

(56) References Cited

U.S. PATENT DOCUMENTS

| 8,238,605 B2 * | 8/2012 | Chien ............... G06K 9/00771 382/103 |
| 9,013,430 B2 * | 4/2015 | McCann ............... G06F 3/0488 345/173 |

(Continued)

FOREIGN PATENT DOCUMENTS

| CN | 102236409 | 11/2011 |
| WO | 2007097548 | 8/2007 |
| WO | 2012170349 | 12/2012 |

OTHER PUBLICATIONS

Xiao-Heng Jiang et al., A Robust Method of Fingertip Detection in Complex Background, published on Jul. 2012,IEEE, pp. 1468-1473.*

(Continued)

*Primary Examiner* — Mekonen Bekele
(74) *Attorney, Agent, or Firm* — Eagle IP Limited; Jacqueline C. Lui

(57) ABSTRACT

A system and method of detecting a posture of at least one predetermined part of an object comprising the steps of extracting a first object shape from a first image taken by a first image sensor, computing a characteristic dimension value of the predetermined part within a predetermined region of the first object shape, constructing a mask based on the characteristic dimension value, extracting a profile of the predetermined part from the first object shape by applying the mask on the first object shape, and identifying at least one predefined feature point in the profile of the predetermined part, thereby detecting the posture of the predetermined part is disclosed.

23 Claims, 6 Drawing Sheets

(56) References Cited

U.S. PATENT DOCUMENTS

| | | | |
|---|---|---|---|
| 2003/0229299 A1* | 12/2003 | Shimura | G06T 7/0012 600/595 |
| 2005/0063564 A1 | 3/2005 | Yamamoto et al. | |
| 2008/0273755 A1* | 11/2008 | Hildreth | G06F 1/1626 382/103 |
| 2009/0245571 A1* | 10/2009 | Chien | G06K 9/38 382/103 |
| 2012/0016267 A1* | 1/2012 | Campbell | A61B 5/1172 600/587 |
| 2013/0016879 A1 | 1/2013 | Baele et al. | |
| 2013/0194253 A1* | 8/2013 | Ohmi | G06T 19/00 345/419 |
| 2015/0244911 A1* | 8/2015 | Xie | H04N 5/2258 348/207.11 |
| 2015/0363585 A1* | 12/2015 | Gooding | G06F 21/32 726/19 |

OTHER PUBLICATIONS

Dung Duc Nguyen et al., "Fingertip Detection with Morphology and Geometric Calculation", published on Oct. 11-15, 2009, IEEE, pp. 1460-1465.*

Guo Kangde et al.,, "3D Fingertip tracking algorithm based on Computer Vision", Journal of computer research and development, published 2009. 7 pages.*

Dung Duc Nguyen et al., "Fingertip Detection with Morphology and Geometric Calculation", in Proceedings of IEEE/RSJ International Conference on Intelligent Robots and Systems, Oct. 11-15, 2009, pp. 1460-1465, St. Louis, USA.

Li-Wei Chan et al., "Gesture-based Interaction for a Magic Crystal Ball", in Proceedings of 2007 ACM symposium on Virtual reality software and technology, Nov. 5-7, 2007, pp. 157-164, Newport Beach, California.

Eun Yeong Ahn et al., "Dynamic Vision Sensor Camera Based Bare Hand Gesture Recognition", IEEE Symposium on Computational Intelligence for Multimedia, Signal and Vision Processing (CIMSIVP), Apr. 11-15, 2011, pp. 52-59, Paris.

* cited by examiner

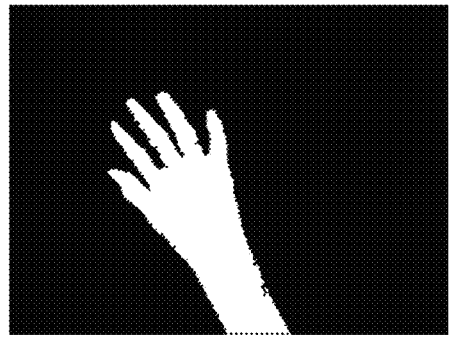
Figure 4a
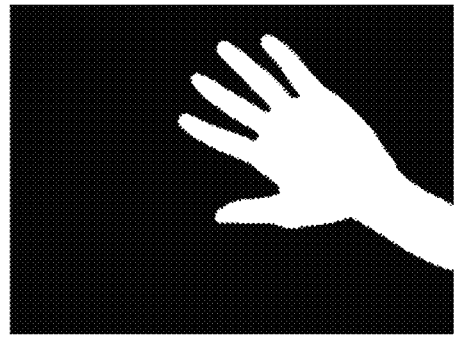
Figure 4b
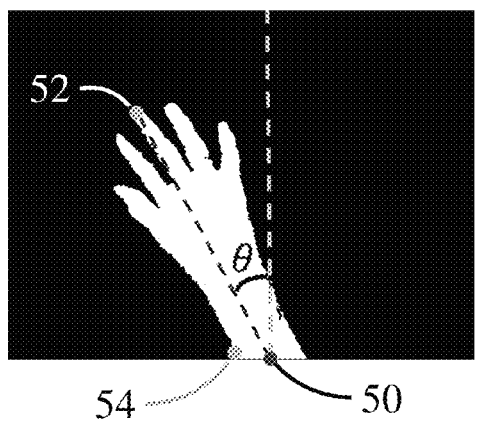
Figure 5a
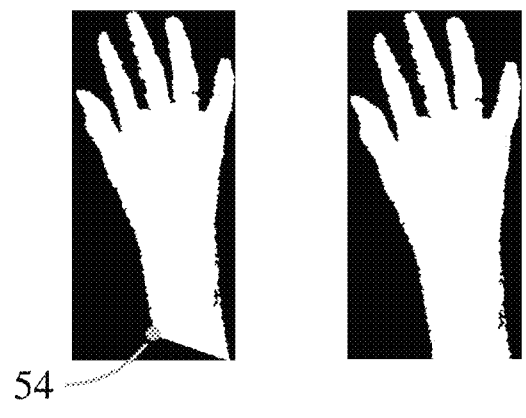
Figure 5b
Figure 5c

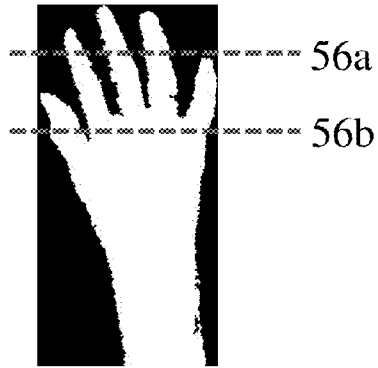
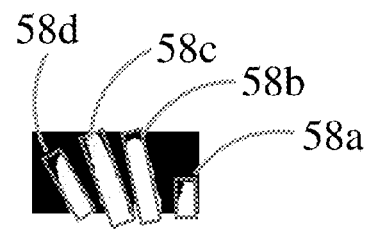
Figure 6a
Figure 6c
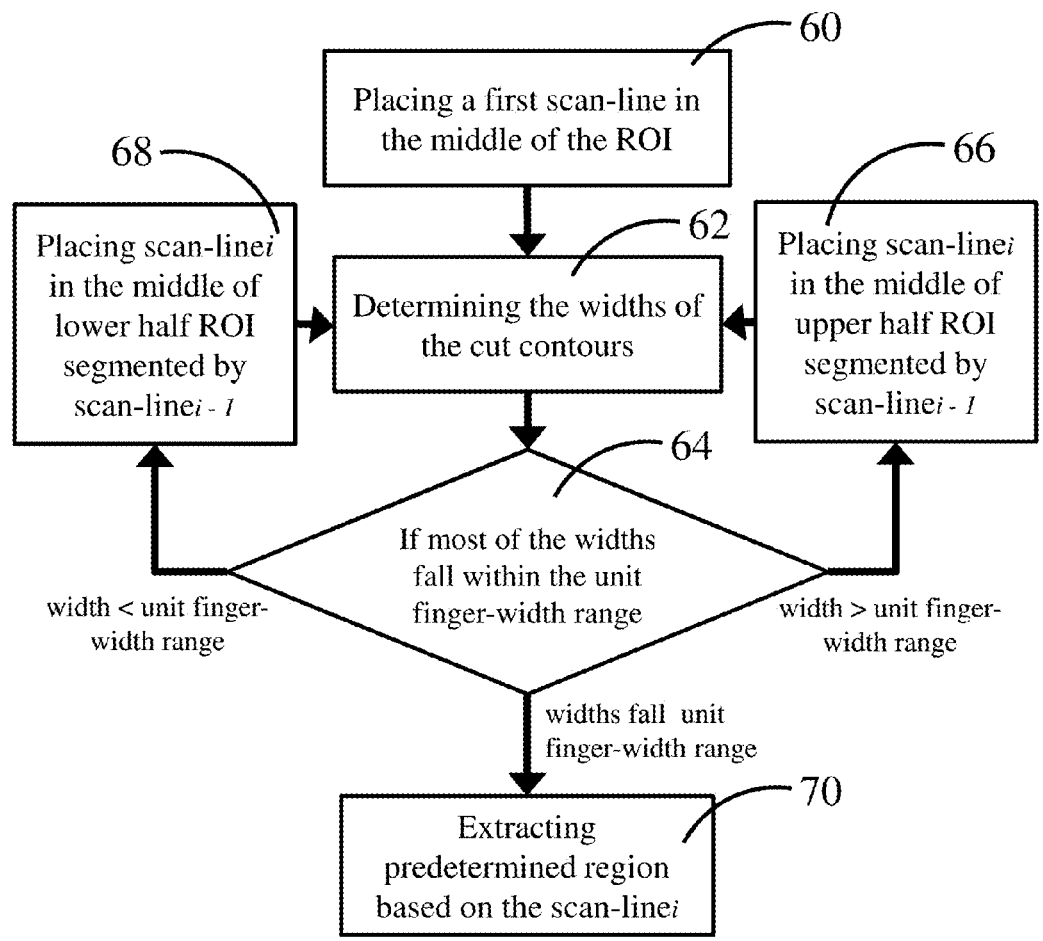
Figure 6b

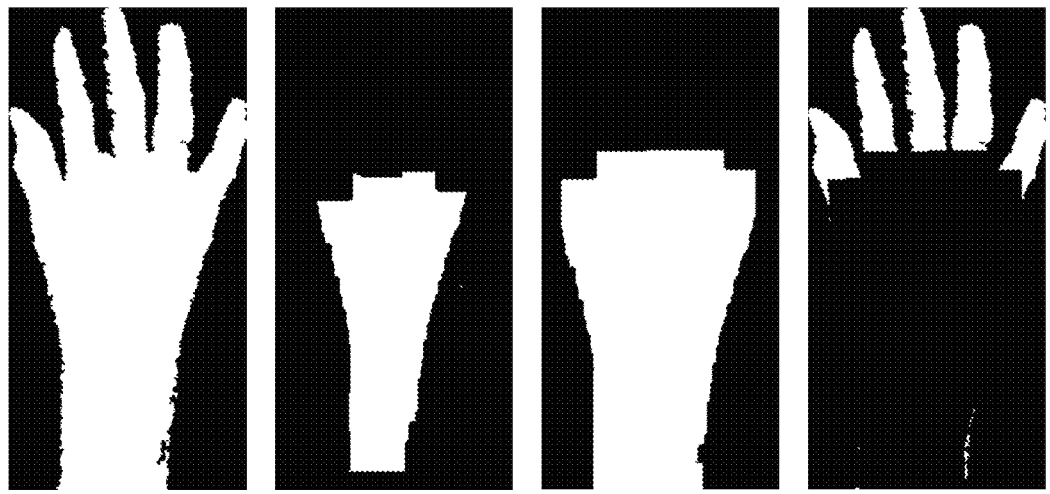
Figure 7a  Figure 7b  Figure 7c  Figure 7d
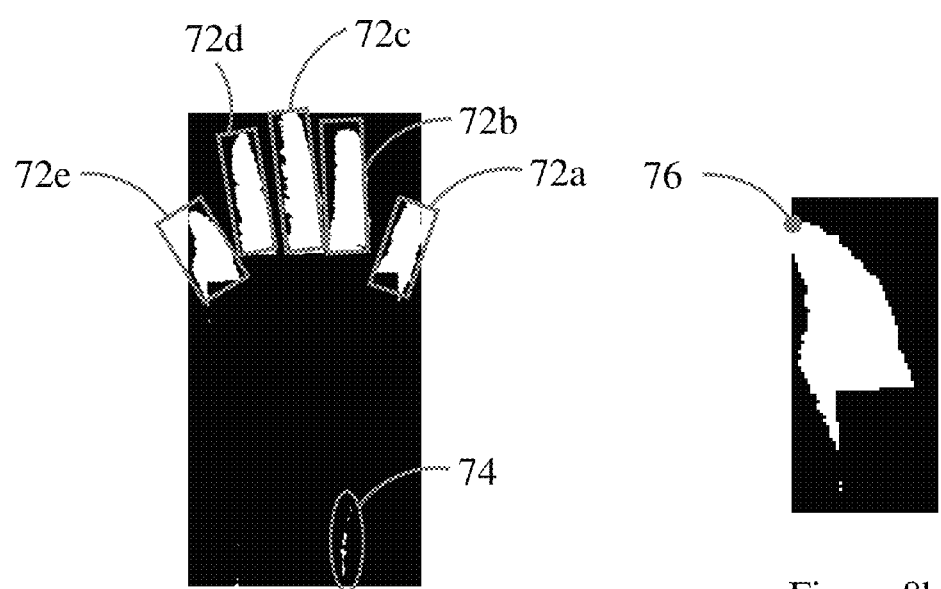
Figure 8a
Figure 8b

SYSTEM AND METHOD FOR DETECTING AND TRACKING MULTIPLE PARTS OF AN OBJECT

FIELD OF INVENTION

This invention relates to a tracking or detection method of a posture of an object, and in particular a method for real-time tracking or detecting a posture of a human hand and a system for implementing the method thereof.

BACKGROUND OF INVENTION

Many advanced image processing applications call for an object tracking module that can track one or more feature points on an object reliably and rapidly. One such application is hand gesture recognition, which is an advanced man-machine interface technology whereby a user can command and control a computing device to perform certain operation without even touching the device. The user will wave one or both of his/her hands in a certain pattern and the computing device will rely on the object tracking module to detect and track the hand movements.

SUMMARY OF INVENTION

In the light of the foregoing background, it is an object of the present invention to provide a method for tracking or detecting an object such as a hand gesture.

Accordingly, the present invention, in one aspect, is a method of detecting a posture of at least one predetermined part of an object. It comprises the steps of extracting a first object shape from a first image by a first image sensor; computing a characteristic dimension value of the predetermined part within a predetermined region of the first object shape; constructing a mask based on the characteristic dimension value; extracting a profile of the predetermined part from the first object shape by applying the mask on the first object shape; and identifying at least one predefined feature point in the profile of the predetermined part; thereby detecting the posture of the predetermined part.

In one embodiment, the computing the characteristic dimension value further comprises the steps of determining a reference value of a reference part of the object wherein the reference part is different from the at least one predetermined part; and calculating a plurality of thresholds based on the reference value.

In another embodiment, the computing the characteristic dimension value further comprises the steps of determining a plurality of segmentation boundaries based on a first subset of the plurality of thresholds; extracting the predetermined region from the first object shape based on the segmentation boundaries; identifying the predetermined part within the predetermined region based on a second subset of the plurality of thresholds; measuring dimensional values of the predetermined parts within the predetermined region; and calculating the characteristic dimension value based on the dimensional values of the predetermined parts within the predetermined region.

In another embodiment, the calculating the characteristic dimension value further comprises the steps of calculating a set of distinguishing factors based on the dimensional values of the predetermined parts within the predetermined region; and computing the characteristic dimension value as a weighted average of the dimensional values, wherein the weighted factors of the weighted average are based on the set of distinguishing factors and a margin coefficient.

In another embodiment, the method of detecting a posture of at least one predetermined part of an object further comprises a step of updating the first subset and the second subset of the plurality of thresholds based on the characteristic dimension value.

In another embodiment, the constructing step further comprises the steps of performing an erosion operation on the first object shape thereby forming an eroded shape; and performing a dilation operation to the eroded shape thereby forming the mask; wherein the size of the structure elements of the erosion operation and the dilation operation are based on the characteristic dimension value. In a further embodiment, the size of the structure elements is half of the characteristic dimension value.

In another embodiment, the identifying step further comprise the steps of identifying each of the at least one predetermined part of the object in the profile of the predetermined part; and determining at least one first feature point location for each of the at least one predefined feature point in the first image.

In another embodiment, the object is a human hand; the at least one predetermined part is a finger of the human hand and the at least one predefined feature point is fingertip of the finger. The method further comprises the steps of establishing a region of interest which encloses the finger in the profile of the first image and locating the coordinate of the fingertip by searching a convex point within the region of interest.

In another embodiment, the method of detecting a posture of at least one predetermined part of an object further comprises the steps of extracting a second object shape of the object from a second image by a second image sensor; computing a second characteristic dimension value of the predetermined part within a second predetermined region of the second object shape; constructing a second mask based on the second characteristic dimension value; extracting a second profile of the predetermined part from the second object shape by applying the second mask on the second object shape; and identifying the at least one predefined feature point in the second profile of the predetermined part; determining a second feature point location of each of the predefined feature points in the second image; and determining a three-dimensional coordinates of each of the feature point based on the first feature point location and the second feature point location; wherein the first image and the second image are acquired simultaneously and the second image sensor is disposed at a predetermined distance from the first image sensor. In a further embodiment, the step of determining the three-dimensional coordinates is based on triangulation.

According to another aspect of the present invention, a method of identifying at least one predetermined part of an object comprising the steps of obtaining a model of the object; extracting an object shape of the object from a first image; computing a characteristic dimension value of the at least one predetermined part from the object shape based on the model; constructing a mask based on the characteristic dimension value; extracting a profile of the at least one predetermined part from the object shape by applying the mask on the object; and identifying the at least one predetermined part from the profile. In one embodiment, the model describes at least one relationship between the at least one predetermined part and the object;

According to yet another aspect of the present invention, a system of detecting a posture of at least one predetermined part of an object is disclosed. The system comprises a first image sensor configured to capture at least one first image of the predetermined part from a first view angle; an image processing subsystem coupled to the first image sensor wherein the image processing subsystem takes the at least one first image as input and produces at least one first feature point location as output. The image processing subsystem further comprises the followings: an object extractor module configured to extract an object shape of the object from the input; a body part locator configured to locate the at least one predetermined part within a predetermined region of the object shape wherein the body part locator further determines a characteristic dimension value of the at least one predetermined part; and a feature point locator configured to identify at least one feature point location within the at least one predetermined part in a profile. The profile is obtained by masking the first object shape with a mask that is constructed based on the characteristic dimension value. The feature point locator further couples the at least one first feature point location to the output of the image processing subsystem so that the posture can be detected by tracking the at least one first feature point location obtained from the image processing subsystem.

In one embodiment, the system of detecting a posture of at least one predetermined part of an object further comprises a microprocessor coupled to the image sensor; and a non-transitory computer-readable storage medium coupled to the microprocessor, wherein the non-transitory computer-readable storage medium is encoded with computer-readable instructions that implements functionalities of at least one of the object extractor module, the body part locator and the feature point locator whereby when the computer-readable instructions are executed, the microprocessor performs the respective function.

In another embodiment, the feature point locator further comprises a morphological masking module. At least one of the object extractor module, the body part locator, the feature point locator and the morphological masking module is implemented by dedicated hardware.

In another embodiment, the system of detecting a posture of at least one predetermined part of an object further comprises a second image sensor configured to capture at least one second image of the object from a second view angle wherein the second image sensor is disposed at a predetermined distance from the first image sensor and the second image are acquired simultaneously along with the first image. The image processing subsystem is further configured to alternatively take the first image as input to produce at least one first feature point location and take the second image as input to produce at least one second feature point location. A three-dimension position detection module is also incorporated to the system and is coupled to the output of the image processing subsystem. This module determines at least one three-dimensional coordinate of at least one feature point of the at least one predetermined part of the object based on the at least one first feature point location and the at least one second feature point location.

In another embodiment, both the first image and second image are binary image.

There are many advantages to the present invention. In particular, the present invention provides an adaptive, accurate and fast tracking or detecting method that works well in practical environment, especially with arbitrary postures of the objects. The present invention can operate reliably under a diverse background environments, lighting conditions and different orientations and sizes of the object. In other words, the present invention could perform robustly and accurately when the object moves closer to the cameras (hence the image size is bigger) or farther away from the cameras (the image size becomes smaller) as well as in different orientations with respect to the cameras.

Another advantage of the present invention is that minimum computing resources are required. Therefore, the entire algorithm can be implemented a low cost micro-computer system.

Using the present invention, there is also no need for elaborated calibration before use. As long as the object is inside the field of view of the cameras, the present invention can adjust its internal parameters continuously to adapt to different object geometric configurations.

BRIEF DESCRIPTION OF FIGURES

FIG. 4a shows a first image captured by the first image sensor according to one embodiment of the present invention.

FIG. 4b shows another first image captured by the first image sensor according to another embodiment of the present invention.

FIGS. 5a-5c show a sequence of intermediate images in extracting a human hand shape according to one embodiment of the present invention.

FIG. 6a shows a plurality of segmentation boundaries on the extracted human hand shape according to one embodiment of the present invention.

FIG. 6b is a detail method of the segmentation algorithm according to one embodiment of the present invention.

FIG. 6c shows the fingers from the human hand shape in a predetermined region, which is extracted within the plurality of segmentation boundaries according to one embodiment of the present invention.

FIGS. 7a-7d show a sequence of intermediate images in constructing a mask, applying the mast on the human hand shape and extracting a profile of the at least one finger of the human hand shape according to one embodiment of the present invention.

FIG. 8a shows the profile with the fingers identified therein the according to one embodiment of the present invention.

FIG. 8b shows the profile of one of the fingers identified with a feature point identified therein according to one embodiment of the present invention.

DETAILED DESCRIPTION OF THE PREFERRED EMBODIMENTS

As used herein and in the claims, "comprising" means including the following elements but not excluding others.

The system and method of the present invention can be used to detect or track at least one predetermined part of an object as long as the at least one predetermined part is extended from the object. As an exemplary embodiment only, the system and method described hereinafter is for detecting or tracking at least one finger (i.e. at least one predetermined part) of a human hand (i.e. an object). It will be appreciated that the detecting or tracking system of the present invention is not limited to that. For example, the present invention may be applicable to detect a limb of an animal body and a wing of an aircraft etc. It will be clear to one skilled in the art that the present invention may be practiced with variations of the specific details described hereinafter.

Figure 1:
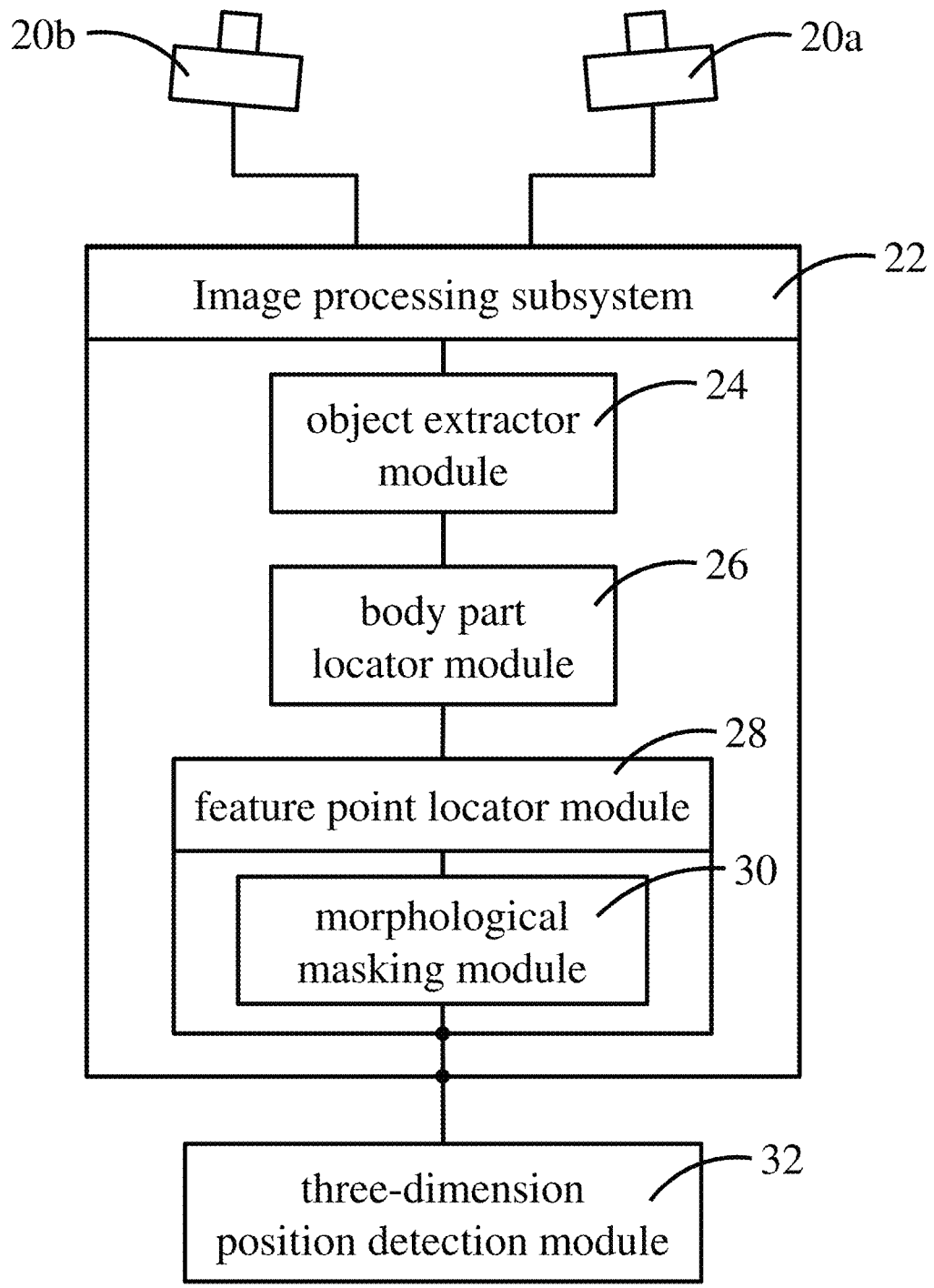
FIG. 1 is a functional block diagram of the components of a detecting or tracking system according to one embodiment of the present invention.

FIG. 1 is a functional block diagram of the components of a detecting or tracking system according to one embodiment of the present invention. The system comprises a plurality of image sensors (20a and 20b), an image processing subsystem 22, and a three-dimension position detection module 32. The input end and the output end of the image processing subsystem 22 are coupled to the plurality of image sensors (20a and 20b) and the three-dimension position detection module 32 respectively. In one embodiment, each of the image sensors (20a and 20b) is configured to synchronously capture a plurality of images of a hand that may be in motion. The image processing subsystem 22 is configured to process at least one image from each of the image sensors (20a and 20b) independently. It further comprises an object extractor module 24, a body part locator module 26 and a feature point locator module 28. The at least one image received from the input of the image processing system 22 is fed to the object extractor module 24 which is configured to extract the shape of the hand. The latter is passed to the body part locator module 26 which is configured to locate the at least one finger within a predetermined region of the human hand shape. The body part locator module 26 also determines a characteristic dimension value ($W_F$) of the at least one finger. The feature point locator module 28 makes use of the characteristic dimension value ($W_F$) to analyze the original input image. It further comprises a morphological masking module 30, which is configured to obtain a profile of at least one finger by masking a first human hand shape with a mask that is constructed based on the characteristic dimension value ($W_F$). The feature point locator module 28 is configured to identify at least one feature point location (i.e. landmark 76 in FIG. 8b) within the at least one finger in the profile and to generate the at least one feature point 76 as an output of the image processing subsystem 22. Hence the image processing subsystem 22 takes an input image as input and produces at least one feature point location 76 as output.

In one exemplary embodiment, the first image sensor 20a and the second image sensor 20b are disposed at a predetermined distance from each other, and they capture images of the same object but from a different view angle. In one embodiment, the first image sensor 20a and the second image sensor 20b are disposed at a predetermined distance from each other and in parallel. The distance between the first image sensor 20a and the second image sensor 20b is dependent on the expected working range and the accuracy of the detecting or tracking system of the present invention. In one embodiment, the distance between the first image sensor 20a and the second image sensor 20b is 40 mm. In a further embodiment, the first image sensor 20a and the second image sensor 20b are infra-red image sensors. The image processing subsystem 22 is further configured to independently process the first image from the first image sensor 20a to produce at least a first feature point location, and the second image from the second image sensor 20b to product at least a second feature point location. Both of the at least first feature point location and the at least second feature point location are passed to the three-dimension position detection module 32 which is configured to determine a three-dimension position of at least one interested point (i.e. at least one feature point) based on the at least first feature point location and the at least second feature point location. By detecting or tracking the feature point location 76, the posture of the at least one finger can be tracked and detected. The details of the detecting or tracking method implemented in the image processing subsystem and the modules will be discussed in the paragraphs below.

The image processing subsystem 22 and any one of the modules (24, 26, 28, 30 and 32), or a portion of them, can be implemented by dedicated hardware; or pure software; or partially hardware and software. If the image processing subsystem 22 and the modules (24, 26, 28, 30 and 32) are implemented by software or partially hardware and software, the image processing subsystem 22 and the modules (24, 26, 28, 30 and 32) further comprise at least one microprocessor and at least one non-transitory computer-readable storage medium coupled to the at least one microprocessor, wherein the at least one non-transitory computer-readable storage medium encoded with computer-readable instructions for causing the at least one microprocessor to perform at least part of the functions of the modules and subsystem as stated above and/or the steps of the processing method as discussed below. The at least one microprocessor is further connected to the first image sensor 20a and/or the second image sensor 20b.

Figure 2:
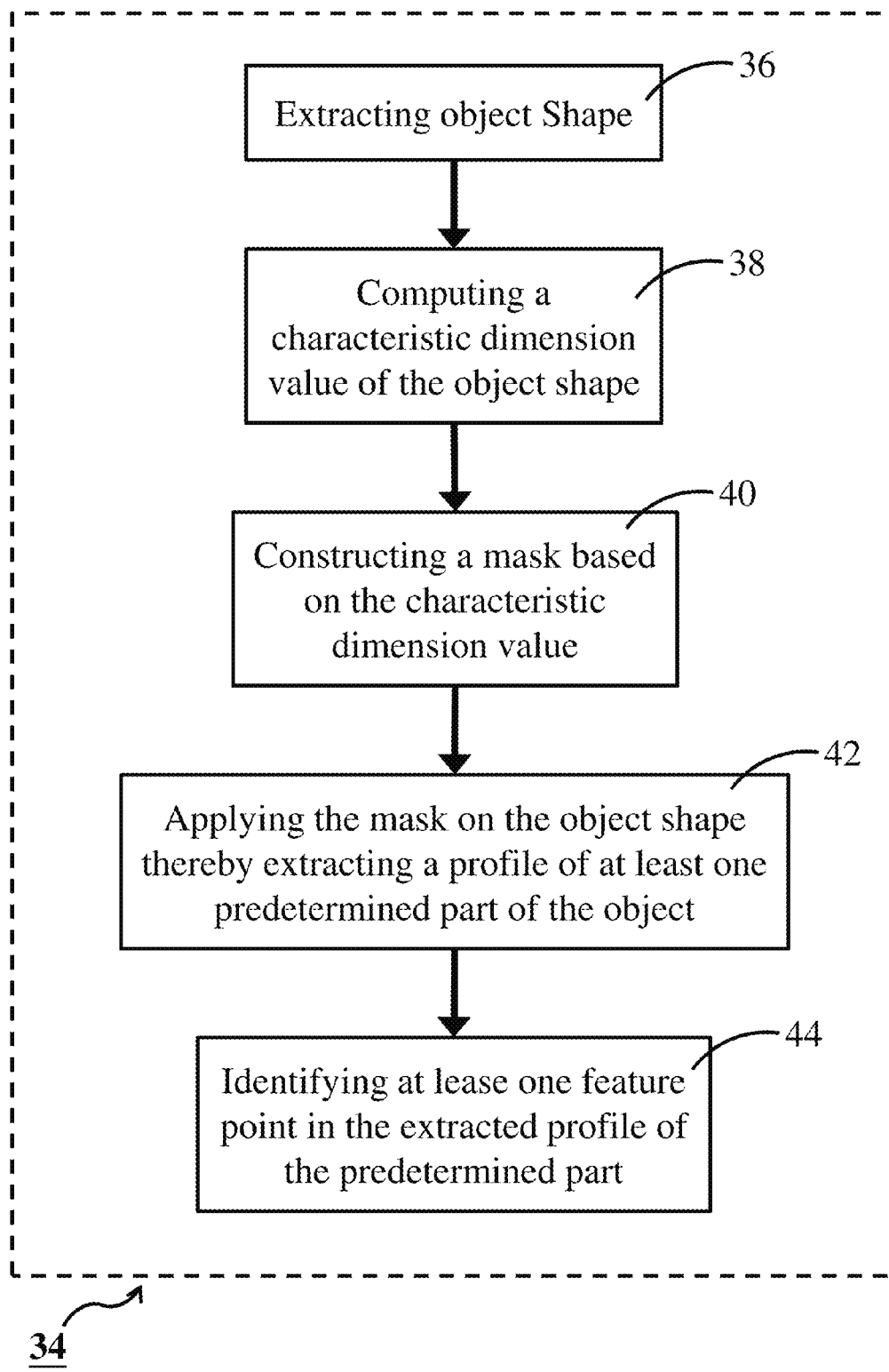
FIG. 2 shows a flow diagram illustrating a detecting or tracking method implemented in the image processing subsystem and the modules therein according to one embodiment of the present invention.

Now turning to the detail processing method of the image processing subsystem 22 and the modules (24, 26, 28, 30 and 32) as described above. FIG. 2 shows a flow diagram illustrating the detecting or tracking method 34 implemented in the image processing subsystem 22 and the modules (24, 26, 28 and 30) therein. The detecting or tracking method 34 first starts with capturing a first image comprising a human hand (i.e. the object) by a first image sensor 20a and forwarding the first image to the input end of the image processing subsystem 22. At the same time, a second image comprising the human hand is also captured by a second image sensor 20b and is forwarded to the input end of the image processing subsystem 22. Each of the images is processed by the image processing subsystems 22 and the modules therein (24, 26, 28 and 30) independently. In one embodiment, the image processing subsystem 22 converts the input image to a binary image. In a further embodiment, the human hand is represented by the maximum intensity value (i.e. white color) in the image and the remaining background is represented by the minimum intensity value (i.e. black color).

In step 36, a human hand shape (i.e. the object shape) in the image is extracted and a fingertip of the most extended finger is also located if there is at least one finger extended in the image. In one embodiment, the extracted human hand shape points upwardly, which means that the fingertip of the most extended finger touched the top boundary of the human hand shape. Step 36 is performed by the object extractor module of the image processing subsystem 22. Afterwards, a characteristic dimension value ($W_F$) of the human hand shape is computed within a predetermined region of the human hand shape in step 38. Step 38 is performed by the body part locator module 26 of the image processing subsystem 22, which receives the human hand shape from the object extractor module 24.

In one embodiment, the characteristic dimension value ($W_F$) is computed by first finding a reference value ($W_{ref}$). In another embodiment, the reference value is the width of the palm or the width of the wrist of the human hand. The details of how to determine this reference value is described later.

In one embodiment, the probable finger size of an ordinary user is defined in a model of human finger. The model contains attributes and parameters of typical hand-finger geometry, as well as parameters such as the typical ranges of finger widths and finger height relative to the reference value ($W_{ref}$) and other relevant predetermined values. In other words, the reference value ($W_{ref}$) is used to specify the range of probable finger width and probable finger length. In one specific embodiment, the unit finger-width range is specified to be within the range of $K_1 \cdot W_{ref}$ to $K_2 \cdot W_{ref}$, wherein $K_1$ and $K_2$ are first and second predetermined values. In another specific embodiment, the finger-height range is from $K_3 \cdot W_{ref}$ to $K_4 \cdot W_{ref}$, wherein $K_3$ and $K_4$ are third and fourth predetermined values. In another specific embodiment, $K_1$, $K_2$, $K_3$, $K_4$ are 0.1, 0.6, 0.3 and 1.5 respectively.

In a further embodiment, a plurality of segmentation boundaries (56a and 56b as shown in FIG. 6a) is determined based on at least one of the thresholds. In one embodiment, the threshold is based on the finger-height range. The minimum and maximum height of the segmentation boundaries are the perpendicular distances of $K_3 \cdot W_{ref}$ and $K_4 \cdot W_{ref}$ from the fingertip to the palm respectively. After the two segmentation boundaries (56a and 56b) are determined, a predetermined region (i.e. the extracted image of FIG. 6c) from the human hand shape is extracted. In one embodiment, the lower boundary of the predetermined region is randomly selected within the segmentation boundaries (56a and 56b). In another embodiment, segmentation convergence algorithm is performed within the segmentation boundaries (56a and 56b) until the maximum number of fingers is found. The line having the maximum number of fingers is then defined as the lower boundary of the predetermined region. In the latter case, the unit-finger width range is used to identify the number of eligible fingers so the predetermined region contains most, if not all, of the fingers in the input image. In a further embodiment, fast segmentation algorithm, for instance the binary segmentation algorithm and the golden section segmentation algorithm, is adopted. A specific implementation of the fast segmentation algorithm will be described in details in FIG. 6b-6c and the paragraphs describing FIG. 6b-6c below.

After the predetermined region is determined, a dimension value, particularly the width, of each of the fingers identified within the predetermined region is measured. In order to determine whether the fingers identified contain more than one finger (as sometimes two fingers are placed together side-by-side and not separable in the image), the smallest width measured among the fingers identified is compared with the width(s) of other finger(s) identified. The comparison is carried out by calculating a set of distinguishing factors $a_i$ which is defined as follow:

$$a_i = \text{round}(W_i / W_{min})$$

where $a_i$ is the $i^{th}$ distinguishing factor and $W_i$ is the width of the $i^{th}$ finger identified, while $W_{min}$ is the smallest width measured among the fingers identified. The value of $a_i$ is rounded to the near integer. Thus, if $a_i$, corresponding to the $i^{th}$ identified finger, equals to 2, there are two fingers placed together side-by-side at the $i^{th}$ finger position in the image.

The characteristic dimension value ($W_F$) of the at least one finger is then computed as a weighted average of the dimensional values (particularly the widths) of the fingers identified within the predetermined region, wherein the weighting factors of the weighted average are based on the set of distinguishing factors $a_i$ and a margin coefficient K. In one embodiment, the characteristic dimension value ($W_F$) of the at least one finger is computed by the formula as shown below:

$$W_F = \frac{K \sum_{i=1}^{N} \left(\frac{W_i}{a_i}\right)}{N}$$

where N is the total number of fingers identified. In one embodiment, the margin coefficient K equals to 1.1.

In step 40, a mask is constructed based on the characteristic dimension value ($W_F$) obtained in step 38. Thereafter, the profile of at least one finger of the human hand is extracted by applying the mask on the human hand shape in step 42. Both steps 40 and 42 are performed in the morphological masking module 30.

In step 44, the location of at least one predefined feature point in the profile of the at least one finger is identified. In one embodiment, the predefined feature point is the fingertip and the two-dimension coordinate of the fingertip in the image is located. Step 44 is performed by the feature point locator module 28. Steps 40, 42 and 44 will be described in detail in the paragraphs which discuss FIGS. 7 and 8 below.

Figure 3:
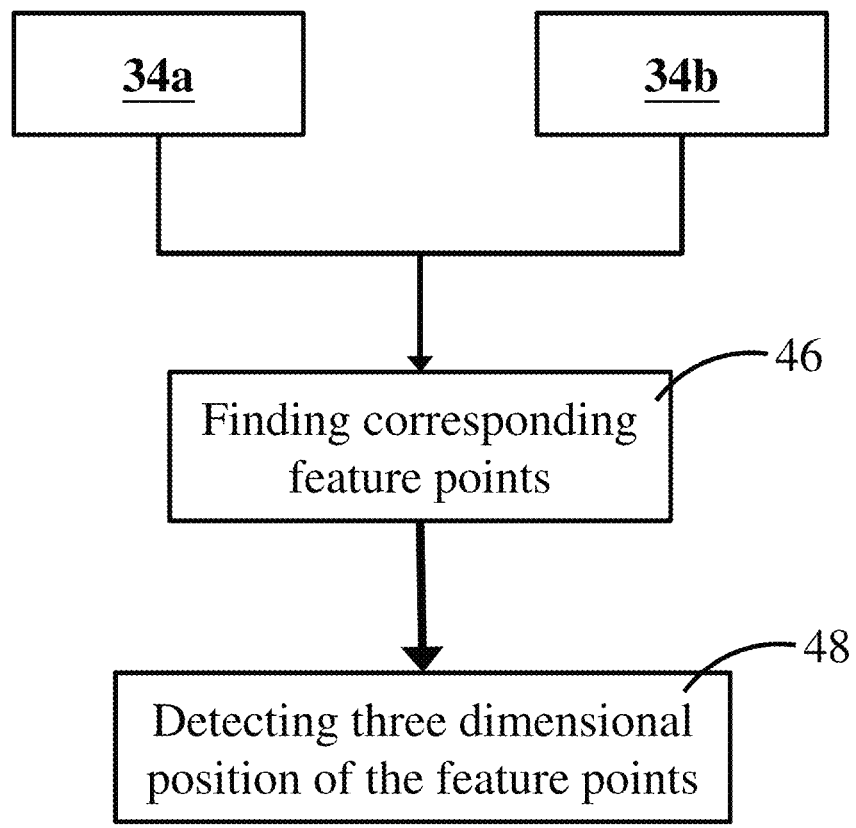
FIG. 3 is a flow diagram illustrating a three dimensional position detection method implemented in the three-dimension position detection module according to the one embodiment of the present invention.

FIG. 3 shows a flow diagram illustrating the three dimensional position detection method implemented in the three-dimension position detection module 32 (as shown in FIG. 1). Corresponding feature point locations in the first image and the second image are found in step 46 based on the feature point locations identified in the first and second profiles generated from the first and second images. There are two profiles as each of the first and second images are independently processed by the detecting or tracking method (34a and 34b) implemented in the image processing subsystem 22 and the modules (24, 26, 28 and 30) therein. In one embodiment, the two profiles are matched using geometric method. After step 46, a three dimensional position of the paired feature points can be calculated by triangulation in step 48. Both steps 46 and 48 are performed in the three-dimension position detection module 32.

FIG. 4a shows a first image captured by the first image sensor 20a according to a specific embodiment of the present invention. FIG. 4b shows another first image captured by the first image sensor 20a at a different time frame and at a different orientation. The present invention works well for images captured in different orientation such as those shown in FIGS. 4a and 4b. In order to demonstrate the flexability of the present invention, a sequence of intermediate images in extracting the human hand shape, from the first image as shown in FIG. 4a, are shown in FIG. 5a-FIG. 5c. When a digital image of a hand is captured by an image sensor (20a or 20b), a binary image of the human hand shape is obtained as discussed previously. In one embodiment as shown in FIG. 4, the human hand shape is shown as white color while the background is black color. Step 36 operates on the white area of the binary image that corresponds to the human hand shape. In FIG. 5a, a starting-point 54 and a mid-point 50 at the bottommost of the human hand shape are located. Further, the fingertip 52 of the most extended finger (if there is at least one finger extended) is also located. After that, an angle θ, which is the angle between the vertical line from the mid-point 50 and the connecting line between the mid-point 50 and the fingertip 52, is determined. The human hand shape is then rotated by an angle θ and cropped such that the human hand shape is placed vertically as shown in FIG. 5b. Finally, the human hand shape as shown in FIG. 5c is extracted by cropping the bottommost part of the human hand shape along the horizontal line drawn from the starting-point 54. Afterwards, the reference value ($W_{ref}$) is determined by measuring the width of the white pixels at the bottommost of the human hand shape as shown in FIG. 5c.

FIG. 6a shows the plurality of segmentation boundaries (56a and 56b) on the extracted human hand shape according to one embodiment of the present invention. As shown in FIG. 6a, the minimum height of the segmentation boundary 56a and maximum height of the segmentation boundary 56b are the perpendicular distance $K_3 \cdot W_{ref}$ and $K_4 \cdot W_{ref}$ from the fingertip to the palm respectively.

FIG. 6b shows the flow chart of the fast segmentation algorithm according to one embodiment of the present invention. The first step 60 of the segmentation convergence algorithm, as shown in FIG. 6b, is to place a first scan-line in the middle of the region of interest (ROI), which is defined by the segmentation boundaries 56a and 56b. Afterwards, widths of the cut contours are determined in step 62. In one embodiment, the pixel intensity transition along the scan-line is traced in order to determine the widths of the cut contours. At the intersections of the scan-line and the boundaries of extracted human hand shape, there would be a pixel intensity transition—either from black to white or white to black. The length of the white region between two consecutive transitions is defined as the width of a cut contour. After determining the widths of the cut contours in step 62, they are compared with the predefined unit finger-width range ($K_1 \cdot W_{ref}$ and $K_2 \cdot W_{ref}$) in step 64. If most of the widths of the cut contours are greater than the predefined unit finger-width range, the next scan-line will be place in the middle of the upper half of the ROI, which is now defined by the segmentation boundaries 56a and the first scan-line, in step 66 and control is then passed to step 62. On the other hand, If most of the widths of the cut contours are smaller than the predefined unit finger-width range, the next scan-line will be place in the middle of the lower half of the ROI, which is now defined by the first scan-line and the segmentation boundaries 56b, in step 68 and then it goes back to step 62. The aforementioned iterative steps will be terminated when most of the widths of the cut contours fall within the unit finger-width ranges. The last step 70 of the fast segmentation algorithm is to extract a predetermined region. Accordingly, the lower boundary of the predetermined region is defined as the scan-line which fulfills the termination criteria. FIG. 6c shows the extracted predetermined region according to the embodiment as shown in FIG. 6a. As shown, the widths of the fingers (58a, 58b, 58c and 58d) identified are used in step 38 to compute the characteristic dimension value.

FIGS. 7a-7d show a sequence of intermediate images in constructing a mask, applying the mask on the human hand shape and extracting a profile of the at least one finger of the human hand shape in steps 40 and 42. FIG. 7a shows the human hand shape where the construction of the mask is based on. In constructing the mask, an erosion operation is firstly performed on the human hand shape. The size of the structure element of the erosion operation is proportional to the characteristic dimension value ($W_F$). In one embodiment, the size of the structure element is $K_5 \cdot W_F$, where $K_5$ is a fifth predetermined value. In a further embodiment, $K_5$ equals 0.5. During the erosion operation, the boundary of the human hand shape is eroded by a distance $K_5 \cdot W_F$, thereby forming an eroded shape as shown in FIG. 7b. After the erosion operation, a dilation operation is performed to the eroded shape. In a similar fashion, the size of the structure element of the dilation operation is $K_6 \cdot W_F$, where $K_6$ is a sixth predetermined value. In one embodiment, $K_6$ equals 0.5. During the dilation operation, the boundary of the eroded shape is dilated by a distance as $K_6 \cdot W_F$, thereby forming the shape as shown in FIG. 7c. It is observed that the wrist region and palm region of the human hand shape is recovered by the dilation operation and thus the resulting shape as shown in FIG. 7c is referred to as the mask created by the morphological masking module 30. By subtracting the image as shown in FIG. 7a from the mask as shown in FIG. 7c, a profile of at least one finger, as shown in FIG. 7d, is obtained.

Afterwards, step 44 is performed on the image shown in FIG. 7d. Firstly, boundary boxes 72a, 72b, 72c, 72d and 72e are established on each of the identified fingers as shown in FIG. 8a. The noise 74 as shown in FIG. 8a is not identified as a finger as the width of the corresponding white region does not fall within the unit finger-width range. For each bounding box, the tip of the corresponding finger is identified as the feature point location. In one embodiment, the feature point location is found by firstly determining a reduced region-of-interest (ROI) along the finger direction; finding the convex points of the finger within the ROI; and then marking the extreme convex point 76 found as the tip of the finger. The two-dimensional coordinates of the extreme convex point 76 is defined as the feature point location.

Optionally, after a characteristic dimension value ($W_F$) is obtained from the first image or the second image, the unit finger-width range and the finger-height range can be updated based on the characteristic dimension value ($W_F$). In one embodiment, the unit finger-width range is set between $K_1^* \cdot W_F$ to $K_2^* \cdot W_F$, wherein the $K_1^*$ and $K_2^*$ are 0.8 and 1.2 respectively according to a particular embodiment. In another specific embodiment, the finger-height range is from $K_3^* \cdot W_F$ to $K_4^* \cdot W_F$ wherein the $K_3^*$ and $K_4^*$ are 1.7 and 5 respectively. In one embodiment, the updated unit finger-width range and updated finger-height range are used to detect or track the at least one finger of a human hand shape in the next images captured by the plurality of the image sensors (20a and 20b). In a further embodiment and when new images from new frames of video are captured, both the characteristic dimension value ($W_F$) and the reference value ($W_{ref}$) are updated for the new frame. As such, the present invention provides a reliable and robuste detection even when the hand moves closer or farther away from the cameras.

The aforementioned system and method have been implemented in software. In one implementation, the software is run on a personal computer (PC) having an Intel® Core2™ Duo processor with clock rate of 2.8 GHz, and 2 Gb RAM. The system is capable of processing 90 frames to 125 frames of images per second when processing images from both image sensors (20a and 20b). Step 36 of extracting object shape takes approximately 2 to 3 milliseconds. Step 38 requires 2 to 3 milliseconds. Step 40 and step combined take 3 to 4 milliseconds. The last step of computing the 3D position (i.e. step 48) requires around 1 millisecond.

The exemplary embodiments of the present invention are thus fully described. Although the description referred to particular embodiments, it will be clear to one skilled in the art that the present invention may be practiced with variation of these specific details. Hence this invention should not be construed as limited to the embodiments set forth herein.

For example, the predetermined values ($K_1$, $K_2$, $K_3$, $K_4$, $K_5$, $K_6$, $K_1^*$, $K_2^*$, $K_3^*$ and $K_4^*$) described above may be used according to the user's preference and the specific problem at hand.

While the aforementioned discussion discloses a detecting or tracking system having a plurality of image sensors 20a and 20b, this invention can also be practiced with various configurations. For example, an alternative system having just one image sensor 20a coupled with the image processing system 22 can be developed to identify at least one pre-defined feature point in at least one predetermined part of an object. In applications that do not require to compute the three dimension coordinates of the at least one pre-defined feature point, the second image sensor 20b and the three dimension position detection module 32 are not necessary.

This disclosure discusses the processing steps of a single image in details. In many applications, the image sensors 20a and 20b are video cameras that produce multiple frames of digital images. In these cases, the image processing system 22 processes each frame of the image from each camera sequentially. Thus for each frame of the image the three-dimension position detection module 32 generates a three dimension coordinate for each feature point of the object. The trajectory of the feature point's coordinate over time can then be traced to determine the posture of the at least one predetermined part of the object.

What is claimed is:

1. A method of detecting a posture of at least one predetermined part of an object, comprising:
   extracting a first object shape from a first image taken by a first image sensor;
   computing a characteristic dimension value of said predetermined part within a predetermined region of said first object shape by:
     determining a plurality of segmentation boundaries based on a first set of thresholds;
     extracting said predetermined region from said first object shape based on said segmentation boundaries;
     identifying said at least one predetermined part within said predetermined region based on a second set of thresholds;
     measuring dimensional values of said at least one predetermined parts within said predetermined region; and
     calculating said characteristic dimension value based on said dimensional values of said predetermined parts within said predetermined region;
   constructing a mask based on said characteristic dimension value;
   extracting a profile of said predetermined part from said first object shape by applying said mask on said first object shape; and
   identifying at least one predefined feature point in said profile of said predetermined part; thereby detecting said posture of said predetermined part.

2. The method according to claim 1 further comprising:
   obtaining a series of frames from said first image sensor;
     computing a characteristic dimension value of said predetermined part within a predetermined region of said series of frames;
     constructing a mask based on said characteristic dimension value;
     extracting a profile of said predetermined part from said series of frames by applying said mask on said series of frames; and
     identifying at least one predefined feature point in said profile of said predetermined part thereby detecting said posture of said predetermined part,
     wherein for each of said series of frames, said characteristic dimension value is re-computed and said mask is re-constructed.

3. The method according to claim 1, wherein said computing a characteristic dimension value includes:
   determining a reference value of a reference part of said object; said reference part being different from said at least one predetermined part; and
   calculating a plurality of thresholds including the first and second sets of the thresholds based on said reference value.

4. The method according to claim 1 further comprising:
   placing scan-line between said plurality of segmentation boundaries using fast segmentation algorithm; wherein said predetermined region is a region between said scan-line and a top boundary of said first object shape.

5. The method according to claim 4, wherein said fast segmentation algorithm is selected from a group consisting of binary segmentation algorithm and golden section segmentation algorithm.

6. The method according to claim 1, wherein said calculating said characteristic dimension value includes:
   calculating a set of distinguishing factors based on said dimensional values of said at least one predetermined parts within said predetermined region; and
   computing said characteristic dimension value as a weighted average of said dimensional values, wherein the weighted factors of said weighted average are based on said set of distinguishing factors and a margin coefficient.

7. The method according to claim 1 further comprising:
   updating said first subset and said second subset of said plurality of thresholds based on said characteristic dimension value.

8. The method according to claim 1, wherein said constructing a mask based on said characteristic dimension value further comprises:
   performing an erosion operation on said first object shape thereby forming an eroded shape; and
   performing a dilation operation to said eroded shape thereby forming said mask;
     wherein sizes of structure elements of said erosion operation and said dilation operation are based on said characteristic dimension value.

9. The method according to claim 1, wherein said identifying at least one predefined feature point further comprises:
   identifying each of said at least one predetermined part of said object in said profile of said predetermined part; and
   determining at least one first feature point location for each of said at least one predefined feature point in said first image.

10. The method according to claim 9 further comprising:
    extracting a second object shape of said object from a second image by a second image sensor;
    computing a second characteristic dimension value of said predetermined part within a second predetermined region of said second object shape;
    constructing a second mask based on said second characteristic dimension value;
    extracting a second profile of said predetermined part from said second object shape by applying said second mask on said second object shape;
    identifying said at least one predefined feature point in said second profile of said predetermined part;

determining at least one second feature point location for each of said at least one predefined feature point in said second image; and determining a three-dimensional coordinates of each of said at least one feature point based on said first feature point location and said second feature point location;

wherein said first image and said second image are acquired simultaneously and said second image sensor is disposed at a predetermined distance from said first image sensor.

11. The method according to claim 10, wherein said determining a three-dimensional coordinates is based on triangulation.

12. The method according to claim 1, wherein said object is a human hand; said at least one predetermined part is a finger of said human hand; said at least one predefined feature point is a fingertip of said finger, further comprising:

establishing a region of interest which encloses said finger in said profile of said predetermined part; and locating coordinates of said fingertip by searching a convex point within said region of interest.

13. A method of identifying at least one predetermined part of an object, comprising:

obtaining a model of said object; said model describing at least one relationship between said at least one predetermined part and said object;

extracting an object shape of said object from a first image;

computing a characteristic dimension value of said at least one predetermined part from said object shape based on said model by:

determining a plurality of segmentation boundaries based on a first set of thresholds;

extracting said predetermined part from said object shape based on said segmentation boundaries;

identifying said at least one predetermined part based on a second set of thresholds;

measuring dimensional values of said at least one predetermined parts; and calculating said characteristic dimension value based on said dimensional values of said predetermined parts;

constructing a mask based on said characteristic dimension value;

extracting a profile of said at least one predetermined part from said object shape by applying said mask on said object shape; and identifying said at least one predetermined part from said profile.

14. The method according to claim 13 further comprising:
obtaining a series of frames from said first image sensor;
computing a characteristic dimension value of said at least one predetermined part from said series of frames based on said model;
constructing a mask based on said characteristic dimension value;
extracting a profile of said at least one predetermined part from said series of frames by applying said mask on said series of frames; and
identifying said at least one pre-determined part from said profile,
wherein for each of said series of frames, said characteristic dimension value is re-computed and said mask is re-constructed.

15. The method according to claim 13, wherein said computing a characteristic dimension value includes:

determining a reference value of said object shape based on said model; and computing said characteristic dimension value based on said reference value.

16. The method according to claim 13 further comprising:
identifying at least one predefined feature point in said predetermined part of said profile; and
detecting a posture of said predetermined part based on said at least one feature point.

17. The method according to claim 16 wherein said object is a human hand; said at least one predetermined part is a finger of said human hand; said at least one predefined feature point is a fingertip of said finger and said model comprises at least one geometric relationship and at least one parameter between said finger and said hand.

18. A system of detecting a posture of at least one predetermined part of an object, comprising:

a first image sensor that captures at least one first image of said predetermined part from a first view angle; and an image processing subsystem coupled to said first image sensor, wherein said image processing subsystem takes said at least one first image as input and produces at least one first feature point location as output; said image processing subsystem includes:

an object extractor module that extracts an object shape of said object from said input;

a body part locator that locates said at least one predetermined part within a predetermined region of said object shape and determines a characteristic dimension value of said at least one predetermined part by: determining a plurality of segmentation boundaries based on a first set of thresholds; extracting said predetermined region from said first object shape based on said segmentation boundaries; identifying said at least one predetermined part within said predetermined region based on a second set of thresholds;

measuring dimensional values of said at least one predetermined parts within said predetermined region; and calculating said characteristic dimension value based on said dimensional values of said predetermined parts within said predetermined region; and a feature point locator that identifies at least one first location feature point within said at least one predetermined part in a profile, said profile obtained by masking said first object shape with a mask that is constructed based on said characteristic dimension value;

wherein said feature point locator further couples said at least one first location feature point to said output of said image processing subsystem; thereby said posture can be detected by tracking said at least one first feature point location obtained from said image processing subsystem.

19. The system according to claim 18 further comprising:
a microprocessor coupled to said first image sensor; and
a non-transitory computer-readable storage medium coupled to said microprocessor, wherein said non-transitory computer-readable storage medium is encoded with computer-readable instructions that implements functionalities of at least one of said object extractor module, said body part locator and said feature point locator;

whereby when said computer-readable instructions are executed, said microprocessor performs respective functions.

20. The system according to claim 18, wherein said feature point locator further comprises a morphological masking module; wherein at least one of said object extractor module, said body part locator, said feature point locator and said morphological masking module are implemented by dedicated hardware.

21. The system according to claim 18, wherein said first image is a binary image.

22. The system according to claim 18 further comprising:
- a second image sensor configured to capture at least one second image of said object from a second view angle; wherein said second image sensor is disposed at a predetermined distance from said first image sensor; wherein said at least one second image is acquired simultaneously along with said first image; wherein said image processing subsystem is further configured to alternatively take said first image as input to produce said at least one first feature point location and take said second image as input to produce at least one second feature point location; and
- a three-dimension position detection module configured to couple to said output of said image processing subsystem, wherein said three-dimension position detection module is configured to determine at least one three-dimensional coordinate of at least one feature point of said at least one predetermined part of said object based on said at least one first feature point location and said at least one second feature point location.

23. The system according to claim 22, wherein said first image and second image are binary images.

* * * * *